United States Patent Office 3,749,745
Patented July 31, 1973

3,749,745
OXIDATION PROCESS FOR THE PRODUCTION
OF FATTY ACIDS
Karl P. Kammann, Jr., Cincinnati, Ohio, assignor to
Emery Industries, Inc., Cincinnati, Ohio
No Drawing. Filed Sept. 1, 1971, Ser. No. 177,133
Int. Cl. C08h 17/36
U.S. Cl. 260—413    4 Claims

ABSTRACT OF THE DISCLOSURE

A process is provided whereby primary and secondary long-chain n-alkylbenzenes are oxidized in the presence of a catalyst at atmospheric pressure to produce fatty acids. The process gives an improved distribution of desirable high molecular weight fatty acids. When primary n-alkylbenzenes are used, the process is highly selective to acids of specific chain lengths to the near exclusion of low molecular weight, less desirable, fatty acids.

BACKGROUND OF THE INVENTION

The preparation of synthetic acids employing catalytic oxidative techniques is known. Low cost petrochemicals, especially paraffins, have been oxidized to obtain complex mixtures containing nearly all possible fatty acids of chain lengths less than that of the starting paraffin. With such heretofore known processes, however, many of the acids have little or no value and their presence only detracts from the quality of the product and complicates the process since for certain applications the undesirable acids must be separated from the desired acid products by distillation or the like. It would be desirable if a process were available wherein petroleum-derived chemicals could be oxidized under relatively mild reaction conditions to obtain high selectivity of acids of specific chain lengths, that is, significantly narrow the distribution of acids produced. It would be even more desirable and especially advantageous if such an oxidation process were to produce a second useful product which was readily separable from the fatty acids.

SUMMARY OF THE INVENTION

I have now found that by the oxidation of primary and secondary long-chain n-alkylbenzenes in the presence of a heavy metal catalyst at atmospheric pressure improved distribution to a narrow range of aliphatic monocarboxylic acids is obtained. The present oxidation process provides a means for selectively and efficiently oxidizing n-alkylbenzenes under relatively mild conditions to obtain high selectivity to fatty acids of specific chain lengths. Further, the process yields benzoic acid, a valuable coproduct.

The present oxidation process consists of treating a primary or secondary long-chain n-alkylbenzene wherein the alkyl group contains from about 8 to 50 carbon atoms with oxygen at a temperature between about 90 and 180° C. at atmospheric pressure or up to 200 p.s.i.g. or higher. A catalyst comprised of a heavy metal organic compound, preferably a mixture of manganese and cobalt acetates and naphthenates, and bromine or bromine-containing compound, preferably ammonium bromide, is employed in an amount from about 0.5 to 12% by weight based on the n-alkylbenzene feedstock. The molar ratio of heavy metal to bromine will range from about 10:1 to about 1:10. Preferably the reaction medium for conducting the oxidation is acetic acid or propionic acid.

DETAILED DESCRIPTION

The present oxidation process employs primary and secondary long-chain n-alkylbenzenes. These starting materials may be obtained from any source. The primary and secondary long-chain n-alkylbenzenes have the general formula

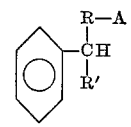

wherein R is a bivalent hydrocarbon radical containing about 8 to 50 carbon atoms, R' is hydrogen or a hydrogen radical containing from 1 to about 25 carbon atoms, and A is hydrogen or a carboxyl group. If R' is a hydrocarbon radical, i.e., secondary n-alkylbenzenes are employed, the total number of carbon atoms $(R+R')$ will be between 9 and about 50. The hydrocarbon radicals are saturated, straight-chain radicals, however, minor amounts of unsaturation and branching may be present and are not detrimental to the process. Most preferably, R' is an alkyl group containing between 8 and 30 carbon atoms when R' is hydrogen and if R' is a hydrocarbon radical, preferably it is an alkyl group containing from 1 to 8 carbon atoms and the combined carbon atom content of R and R' will be between 9 and 30.

From the above description, it is evident that numerous compounds are possible with the present process. For example, if A is hydrogen, monobasic fatty acids are obtained. If A is a carboxyl group, dibasic acids are produced. Also depending on the choice of hydrocarbon radicals, the chain lengths of both the monobasic and dibasic acids may be widely varied. In addition to the aforementioned process variations, numerous other modifications are possible as will be recognized by those skilled in the art. For example, it is possible to have other groups substituted on the R or R' radicals and if these groups are inert to the oxidative conditions employed and do not make the hydrocarbon chain susceptible to oxidation at the point of substitution, appropriately substituted mono- and dibasic acids will result. Inert functional groups may also be present on the benzene nucleus. It is also possible and within the scope of the present invention to have one or more alkyl groups, generally of low molecular weight such as methyl or ethyl, which can be oxidized to carboxyl groups, substituted on the benzene ring. Employing this latter technique, it is possible to obtain mono- or dibasic acids and a polycarboxyl-substituted aromatic compound such as phthalic acid, isophthalic acid, terephthalic acid, trimesic acid and the like, as the coproduct. Additionally, if long-chain alkyl groups are substituted on the aromatic nucleus, e.g., symmetrical tri-(long-chain alkyl) benzenes, 3 mols of the fatty acid and one mol trimesic acid will be produced per mol of starting material by the process of the present invention. Still other variations are possible. Polynuclear aromatic compounds such as naphthalene and anthracene, similarly substituted as described above for benzene, may be oxidized. In general, however, due to the availability of raw materials and cost considerations, the primary and secondary long-chain n-alkylbenzenes are most frequently employed and are a preferred embodiment of the present invention.

The n-alkylbenzenes may be obtained from any source. Primary n-alkylbenzenes, for example, may be prepared by Wurtz-Fittig coupling of aromatic halides with aliphatic halides using metallic sodium, by Clemmensen reduction of Friedel-Crafts acylation products, or they may be obtained by the telomerization of ethylene with benzene as described in Hydrocarbon Processing, 45, 277–280 (September 1966). The telomerization processes provide a particularly practical means for the preparation of useful 1-phenylalkanes. The alkyl group may have an even-number carbon chain or, if toluene is employed with ethylene, an odd-number carbon chain. Employing the telomerization process also permits substitution of more than one alkyl group on the aromatic nucleus and variation of the length of the alkyl group by varying the ethylene pressure, concentration and type of catalyst and other reaction variables. Secondary n-alkylbenzenes may be obtained by alkylation reactions utilizing chloroparaffins, α-olefins or primary alcohols. Many secondary n-alkylbenzenes are commercially available due to their use in the manufacture of detergents. Mixtures of suitable n-alkyl-benzenes may be employed but in order to obtain the best possible results, that is, the narrowest distribution of acid products, the starting materials for the process should be reasonably pure.

Molecular oxygen is required when conducting the present oxidation process. Any source of molecular oxygen may be employed. In general, any gas containing from 5 to 100% by volume molecular oxygen can be used but air, being the most readily available, is preferred. Pure oxygen or substantially pure oxygen may be employed if desired. Mixtures of oxygen and inert gases or air may also be utilized. Ozone in minor amounts can be present, however, for best results excessive amounts of ozone should be avoided.

If narrow distribution of acid products is to be obtained and if the formation of undesirable by-products is to be minimized, moderate reaction conditions should be used. On the other hand, optimum distribution with minimal by-product formation is favored by completing the oxidation as rapidly as possible to avoid prolonged contact with the oxidizing agent. In view of these conflicting considerations, the present process is generally conducted at temperatures ranging from about 90° C. to 180° C. More preferably, a temperature between about 100° C. and 160° C. will be employed. In some instances it may be advantageous to initiate the oxidation at a somewhat higher temperature and then after the oxidation has begun, as evidenced by evolution of heat and/or water, to decrease the temperature to a more preferred operating range.

The process may be conducted at operating pressures up to about 500 p.s.i.g. or higher, however, excellent results are obtained at atmospheric pressure which is preferred. If increasing the pressure is desirable, it will not generally exceed about 200 p.s.i.g.

It is the usual practice of this invention to add the catalyst directly to the starting material to be oxidized. A small amount of water may be added to the reaction mixture to solubilize the catalyst if desired. Other inert organic diluents may also be employed to facilitate the addition of the catalyst but they are not required. Acetic acid and propionic acid may be employed as a reaction medium for the reaction, however, their use is not necessary for the success of the operation. In general, fewer by-products are obtained when the reaction is conducted in the acidic medium. The acidic reaction medium is necessary when optimum oxidation of more than one alkyl group substituted on the benzene ring is desired.

The use of a catalyst for the present oxidation process permits the reaction to be conducted at lower temperatures with acceptable rates and also enhances the selectivity of the oxidation. Heavy metal catalysts such as those suitable for the oxidation of paraffins may be employed. Best results have been obtained when the catalyst is comprised of a heavy metal and bromine or bromine-containing compound. The heavy metal portion of the catalyst may be a heavy metal, per se, or derivative thereof, preferably, heavy metal organic derivatives which exhibit some solubility in the reaction mixture. The useful heavy metals have atomic numbers between about 23 and 84 and more preferably between about 23 and 28. The preferred heavy metals include vanadium, chromium, manganese, iron, cobalt, nickel and mixtures thereof. Excellent results have been obtained when a mixture of manganese and cobalt compounds are employed. Especially useful heavy metal compounds are the various salt forms including the naphthenates, toluates, acetates and salts of other organic acids or organic complexes such as acetylacetonate, 8-hydroxyquinolate, ethylenediaminetetraacetate and the like. Inorganic salts of the heavy metals may also be employed.

The bromine may be present as elemental, combined or ionic bromine. Preferred bromine sources for the catalyst systems are molecular bromine, ammonium bromide and hydrogen bromide but also include other bromine containing compounds such as potassium bromate, benzyl bromide, tetrabromoethane, and the like. Excellent results are obtained if the bromine source is soluble or at least has limited solubility in the primary or secondary n-alkylbenzene. Especially useful catalyst systems for the present oxidation process are derived from ammonium bromide and a mixture of manganese and cobalt acetates and naphthenates.

The amount of heavy metal catalyst compound employed will range from about 0.1 to about 12% by weight based on the n-alkylbenzene feedstock. More typically, from about 0.5 to about 8% catalyst based on the weight of the feedstock will be used. The amount of the individual catalyst components can be varied so that the molar ratio of heavy metal to bromine will range from about 1:10 to about 10:1. Most preferably, the heavy metal:bromine molar ratio will be from 1:3 to 3:1.

The present oxidation process may be conducted in the presence of other compounds which may serve as oxidation promoters or the like such as peroxides, hydroperoxides and other oxygenated compounds. Such compounds may function to facilitate initiation of the oxidation to shorten induction period or serve as accelerators.

The process may be conducted batchwise or in a continuous or semicontinuous manner. When conducted as a batch process, the catalyst will generally be charged completely at the outset of the reaction but further incremental catalyst additions may be made as the oxidation proceeds. In continuous or semicontinuous processes the catalyst is generally charged incrementally or by the proportioning throughout the reaction or with the hydrocarbon feedstock as it is metered into the reactor. Crude oxidate may be recycled and added to the n-alkylbenzene feedstock as it is charged to the reactor to facilitate the reaction and to minimize the amount of catalyst required. Neutral product oxidate, after separation of acid product from total oxidate, may be similarly recycled.

The following examples illustrate the invention more fully but are not intended as a limitation on the scope thereof. In the examples all parts and percentages are on a weight basis unless otherwise indicated.

EXAMPLE I

A resin flask was charged with 30.5 grams n-pentadecylbenzene dissolved in 235 mls. glacial acetate acid, 0.62 gram hydrated manganous acetate, 0.37 gram hydrated cobaltous acetate and 0.34 gram ammonium bromide. The reaction mixture was heated to reflux (about 114° C.) and oxygen metered into the reactor below the surface of the reaction mixture at a rate of 2.5 cu. ft. per hour for 5 hours with high speed stirring. The oxidation was stopped and the acetic acid distilled off. The reaction product was then dissolved in benzene, the oxidate saponified by the addition of 150 ml. 10% sodium hydroxide and the organic phase containing the neutrals and the aqueous phase which contained the sodium soaps of the acids separated. The latter was extracted with 75 ml. benzene and the combined benzene solutions evaporated to yield 6.0 grams neutral products. After acidulation, washing and drying 25.3 grams acid products were recovered. 6.0 grams benzoic acid were obtained with the remainder of the acid product being fatty acids having the following distribution: (determined by vapor phase chromatographic analysis of the methyl esters of the acids) 54% $C_{14}$ acid, 19% $C_{13}$ acid, 18% $C_{10-12}$ acids and 9% $C_9$ and lower acids. Conversion of the n-pentadecylbenzene was 93%.

To demonstrate the advantage of the present process and the improved fatty acid distribution obtained thereby a normal paraffin mixture was oxidized as follows: 140 grams of a mixture of $C_{15-17}$ normal paraffins was charged to a reactor with 1.4 grams manganese naphthenate solution (6% Mn), 0.94 gram cobalt naphthenate solution (6% Co) and 0.25 gram ammonium bromide. Five-tenths ml. water was added and the reaction mixture heated at 130–135° C. for 4 hours with air metered in at a rate of 2.2 cu. ft. per hour. The fatty acid distribution of the acid product was as follows: 3% $C_5$; 6% $C_6$; 10% $C_7$; 12% $C_8$; 13% $C_9$; 14% $C_{10}$; 12% $C_{11}$; 12% $C_{12}$; 8% $C_{13}$; 5% $C_{14}$; 3% $C_{15}$; and 2% $C_{16}$.

From a comparison of the distribution of the fatty acid products obtained by the two processes the advantage of the present process is readily apparent. By the oxidation of the n-$C_{15}$ alkylbenzene over 50% fatty acid containing only one carbon atom less than the alkyl group being oxidized was obtained, whereas with the paraffin oxidation the major products contain from about 3 to 9 fewer carbon atoms than the starting paraffins. Also, the process of this invention gives only 9% fatty acids containing $C_9$ and lower acids while with the oxidation of paraffins, $C_9$ and lower acids constitute about 44% of the total product. This latter fact is even more significant when one considers that the paraffin being oxidized, on the average, was longer than the alkyl group being oxidized in the case of the n-alkylbenzene compound.

EXAMPLE II

Employing a procedure similar to that described in Example I, n-nonylbenzene was oxidized at a temperature of 114° C. employing acetic acid as the reaction medium with the same catalyst as in Example I. Ninety-five percent conversion was achieved. The fatty acid product was made up as follows: 80% $C_8$ acid; 14% $C_7$ acid; 5% $C_6$ acid and 1% $C_5$ acid.

EXAMPLE III 36.5 grams n-nonadecylbenzene was oxidized in acetic acid employing the procedure of Example I. The only deviation from the procedure was in the work-up where a small amount of ethanol was added to bring about complete solubility of the soaps in the aqueous phase. 86% Conversion of the n-nonadecylbenzene was obtained. 20.8 grams fatty acid product was obtained with over 65% of the fatty acids being $C_{18}$ and $C_{17}$ acids.

EXAMPLE IV

To demonstrate the oxidation of n-alkylbenzenes without the use of a solvent, 100 grams n-pentadecylbenzene were charged to a reactor with 1.06 grams manganese naphthenate solution (6% Mn), 0.67 gram cobalt naphthenate solution (6% Co) and 0.15 gram ammonium bromide. Oxygen was passed into the reactor at a rate of 2.5 cu. ft. per hr. and the temperature maintained at 120–125° C. with stirring. The reaction was followed during its progress by sampling and measuring the acid value using a modification of AOCS test procedure Te 1a–64T. After 3 hours 52% of the n-pentadecylbenzene had been converted to acid products and recyclable neutral products such as alkyl aryl ketones and alkyl aryl carbinols. 22.2 grams acid product was obtained. Vapor phase chromatographic analysis of the acid product indicated that 50% of the fatty acids present were $C_{14}$ acids with $C_{13}$ and $C_{12}$ acids constituting over 30% of the total fatty acids.

EXAMPLE V

Secondary n-alkylbenzenes were oxidized as follows: 14.8 grams (0.060 mol) 3-phenyldodecane was dissolved in 138 mls. glacial acetic acid with 0.36 gram hydrated manganous acetate, 0.22 gram hydrated cobaltous acetate and 0.21 gram ammonium bromide. The reaction mixture was refluxed at about 114° C. while oxygen was added at a rate of 2.5 cu. ft. per hr. After 6 hours 76% of the 3-phenyldodecane had been converted, yielding 3.3 grams benzoic acid and 4.1 grams fatty acid in addition to recyclable neutral products. The fatty acids were comprised of about 94% $C_7$, $C_8$ and $C_9$ monobasic acids.

When 3-phenyldodecane was oxidized in propionic acid, 98% conversion was obtained and the resulting fatty acid product contained 92% $C_{7-9}$ fatty acids. Similar results were obtained when the secondary n-alkylbenzenes were oxidized without the use of solvents.

EXAMPLE VI

To demonstrate the versatility of the present process 20 grams phenylstearic acid (a mixture of isomers but containing more 9-phenylstearic and 10-phenylstearic than other isomers) was oxidized for 5 hours in 138 mls. propionic acid at 130° C. The catalyst consisted of 0.36 gram manganous acetate, 0.22 gram cobaltous acetate and 0.21 gram ammonium bromide. Oxygen was added at a rate of 2.5 cu. ft. per hr. After 5 hours vapor phase chromatography indicated all the phenylstearic acid had been reacted. Dibasic acids, monobasic acids and benzoic acid were recovered in a weight ratio of 50:21:29, respectively. The predominant dibasic and monobasic acids had chain length of 7, 8 and 9 carbon atoms.

I claim:

1. An oxidation process to obtain fatty acids in improved distribution which comprises reacting a long-chain n-alkylbenzene of the formula

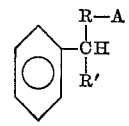

wherein R is an alkylene radical containing between 8 and 30 carbon atoms, R' is hydrogen or an alkyl radical containing from 1 and 8 carbon atoms and the combined carbon content of R and R' is from 9 to about 30, and A is hydrogen or a carboxyl group, with molecular oxygen at a temperature of about 90 to 180° C. in the presence of about 0.1 to about 12% by weight, based on the n-alkylbenzene, of a catalyst comprising a heavy metal compound, said heavy metal having an atomic number between 23 and 28, and bromine or bromine-containing compounds at a molar ratio (heavy metal:bromine) between about 10:1 to 1:10.

2. The oxidation process of claim 1 which is conducted in acetic acid or propionic acid with 0.5 to 8% by weight, based on the n-alkylbenzene, of a catalyst comprised of ammonium bromide and a mixture of manganese and cobalt acetates and naphthenates having a heavy metal:bromine molar ratio from about 3:1 to 1:3.

3. The oxidation process of claim 1 wherein R is an alkylene group containing from 8 to 30 carbon atoms and R' is hydrogen and which is conducted in acetic acid or propionic acid at atmospheric pressure and at a temperature between about 100° C. and 160° C. in the presence of 0.5 to 8% by weight, based on the n-alkylbenzene, of a catalyst comprised of ammonium bromide and a mixture of manganese and cobalt acetates and naphthenates having a heavy metal:bromine molar ratio from about 3:1 to 1:3.

4. The oxidation process of claim 1 wherein R is an alkylene group containing from 8 to 30 carbon atoms, R' is an alkyl radical containing from 1 to 8 carbon atoms and the combined carbon atom content of R and R' is between about 9 and 30 and which is conducted in acetic acid or propionic acid at atmospheric pressure and at a temperature between about 100 and 160° C. in the presence of 0.5 to 8% by weight, based on the n-alkylbenzene, of a catalyst comprised of ammonium bromide and a mixture of manganese and cobalt acetates and naphthenates having a heavy metal:bromine molar ratio from about 3:1 to 1:3.

References Cited
UNITED STATES PATENTS

| | | | |
|---|---|---|---|
| 3,647,866 | 3/1972 | Ito et al. | 260—524 R |
| 2,963,509 | 12/1960 | Barker et al. | 260—524 R |

LEWIS GOTTS, Primary Examiner

E. G. LOVE, Assistant Examiner

U.S. Cl. X.R.

260—533 R, 523 A, 537 P